United States Patent
Alequin

(10) Patent No.: US 10,661,682 B2
(45) Date of Patent: May 26, 2020

(54) VEHICLE SEAT HAPTIC SYSTEM AND METHOD

(71) Applicant: Honda Motor Co., Ltd., Tokyo (JP)

(72) Inventor: Joseph Anthony Alequin, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/037,714

(22) Filed: Jul. 17, 2018

(65) Prior Publication Data
US 2020/0023753 A1 Jan. 23, 2020

(51) Int. Cl.
*B60N 2/00* (2006.01)
*B60N 2/02* (2006.01)
*B60Q 9/00* (2006.01)

(52) U.S. Cl.
CPC ......... *B60N 2/0244* (2013.01); *B60N 2/0228* (2013.01); *B60N 2/0276* (2013.01); *B60Q 9/00* (2013.01); *B60N 2002/0268* (2013.01)

(58) Field of Classification Search
None
See application file for complete search history.

(56) References Cited

U.S. PATENT DOCUMENTS

| | | | |
|---|---|---|---|
| 7,502,480 B2 | 3/2009 | Baudisch et al. | |
| 7,636,034 B2 | 12/2009 | Hijikata et al. | |
| 7,714,701 B2 | 5/2010 | Altan et al. | |
| 7,831,054 B2 | 11/2010 | Ball et al. | |
| 8,277,327 B2 | 10/2012 | Takeda et al. | |
| 9,147,328 B2 | 9/2015 | Ioffreda et al. | |
| 9,539,944 B2 * | 1/2017 | Tzirkel-Hancock | B60Q 9/00 |
| 9,545,879 B2 | 1/2017 | Stebbins et al. | |
| 10,359,855 B1 * | 7/2019 | Vonikakis | B60W 50/16 |
| 2014/0346823 A1 * | 11/2014 | Stebbins | B60Q 9/008 |
| | | | 297/217.1 |
| 2015/0008710 A1 * | 1/2015 | Young | B60N 2/0276 |
| | | | 297/217.3 |
| 2015/0297990 A1 | 10/2015 | Mahlmeister et al. | |
| 2016/0347329 A1 | 12/2016 | Zelman et al. | |
| 2016/0370863 A1 * | 12/2016 | Jones | G06F 3/016 |
| 2017/0231545 A1 | 8/2017 | Shinar et al. | |
| 2018/0029503 A1 * | 2/2018 | Dhaini | B60N 2/0244 |

FOREIGN PATENT DOCUMENTS

AU 2017101323 A4 11/2017

* cited by examiner

*Primary Examiner* — Genna M Mott
*Assistant Examiner* — Melanie J Patrick
(74) *Attorney, Agent, or Firm* — Armstrong Teasdale LLP

(57) ABSTRACT

A vehicle seat haptic system includes a vehicle seat and a controller. The vehicle seat includes a plurality of discrete haptic zones defined across the vehicle seat, and a plurality of actuators positioned in the plurality of haptic zones and configured to generate a haptic output. The controller is communicatively coupled to the plurality of actuators and configured to output a control signal to one or more of the plurality of actuators to generate an asynchronous haptic output across the vehicle seat based upon a position of a user in the vehicle seat.

21 Claims, 7 Drawing Sheets

VEHICLE SEAT HAPTIC SYSTEM AND METHOD

BACKGROUND

The field of the disclosure relates generally to vehicle haptic systems and, more particularly, to vehicle seat haptic systems.

Haptic output systems are designed to communicate information to a person through the person's sense of touch. Haptic output systems are used in a wide variety of industries, including user computing device technology (e.g., haptic systems in smartphones) and automotive technology. In the automotive industry, haptic technology is implemented in user interfaces as well as in other vehicle components (e.g., vehicle seats) to impart information to, for example, a driver. However, known haptic systems provided limited forms of haptic output, with little flexibility in the intensity or location of the haptic output.

BRIEF DESCRIPTION

In one aspect, a vehicle seat haptic system includes a vehicle seat including a plurality of discrete haptic zones defined across the vehicle seat, and a plurality of actuators positioned in the plurality of haptic zones and configured to generate a haptic output. The vehicle seat haptic system also includes a controller communicatively coupled to the plurality of actuators and configured to output a control signal to one or more of the plurality of actuators to generate an asynchronous haptic output across the vehicle seat based upon a position of a user in the vehicle seat.

In another aspect, a vehicle seat haptic system includes a plurality of actuators positioned in a plurality of discrete haptic zones defined in a vehicle seat and a controller. The plurality of actuators is configured to generate a haptic output in the plurality of haptic zones. The controller is communicatively coupled to the plurality of actuators, and is configured to generate a control signal based upon a position of a user in the vehicle seat and output the control signal to one or more of the plurality of actuators to generate an asynchronous haptic output across the vehicle seat.

In yet another aspect, a method of generating a haptic output includes positioning a plurality of actuators in a plurality of discrete haptic zones defined in a vehicle seat, and determining, by a controller, a position of a user in the vehicle seat. The method also includes generating, by the controller, a control signal based upon the position of the user in the vehicle seat, and outputting, by the controller, the control signal to one or more of the plurality of actuators such that the control signal causes the one or more of the plurality of actuators to generate an asynchronous haptic output across the vehicle seat.

DETAILED DESCRIPTION

Figure 1:
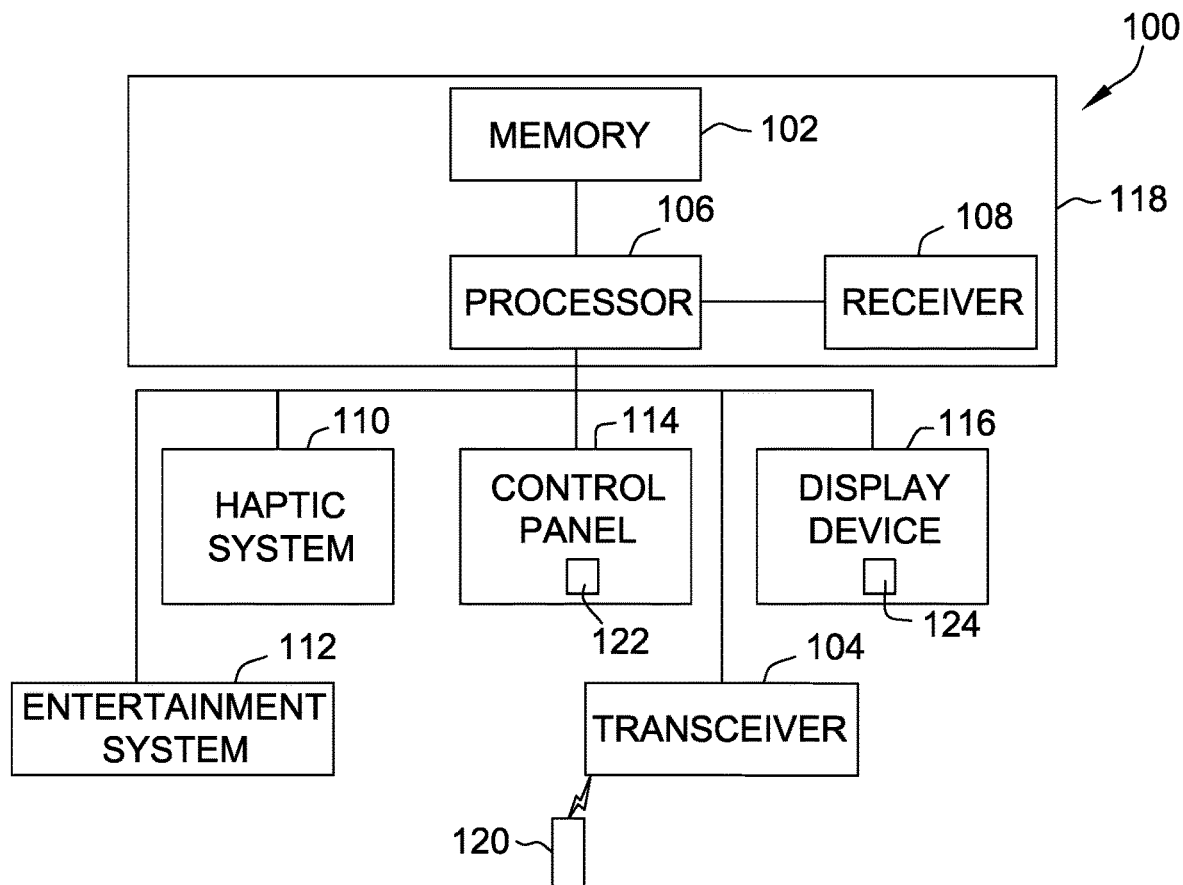
FIG. 1 is a block diagram of an exemplary vehicle control system.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

Various embodiments of methods and systems for controlling functions of a vehicle control system, including a vehicle seat haptic system, are provided. It should be noted that although the various embodiments are described in connection with the automotive industry, such as for an automobile, one or more embodiments may be implemented in different industries and for different applications. Additionally, communication of information used in accordance with one or more embodiments may be performed with different types of communication protocols, as well as using different types of communication lines and communication buses.

FIG. 1 is a block diagram of an exemplary vehicle control system 100. In the exemplary embodiment, the vehicle control system 100 includes a memory 102, a transceiver 104, a processor 106, a receiver 108, a vehicle seat haptic system 110, a vehicle entertainment system 112, a control panel 114, and a display device 116. In some embodiments, the memory 102, the transceiver 104, the processor 106, and/or the receiver 108 may be included in a computing device, such as a controller 118 for the system 100, which may control or otherwise be communicatively coupled to any other component of the system 100 (e.g., the vehicle seat haptic system 110, the vehicle entertainment system 112, the control panel 114, and/or the display device 116).

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® protocol (Bluetooth is a registered trademark of Bluetooth Sig., Inc. of Bellevue, Wash.). In other embodiments, another wireless protocol may be used. In some embodiments, the transceiver 104 may be included as part of the controller 118.

The vehicle seat haptic system 110 may communicate with the processor 106 via a communication line to transmit data to/from the vehicle seat haptic system 110, such as for control of components of the vehicle seat haptic system 110 as described further herein. The vehicle seat haptic system 110 includes one or more vehicle seats of the vehicle and may be considered to include the controller 118, inasmuch as the controller 118 receives data from and/or transmits data (including control signals) to one or more components at the vehicle seats. In some embodiments, controller 118 or components thereof may be incorporated into one or more of the vehicle seats.

The vehicle entertainment system 112 may include one or more speakers for playing audio content, as well as one or more controls for controlling audio output from one or more of the speakers. The vehicle entertainment system 112, in some embodiments, includes a rear entertainment system, such that passengers at a rear passenger location of a vehicle (e.g., vehicle 300, shown in FIG. 3) may be entertained. The rear entertainment system may include a display screen for displaying video or picture content in combination with audio content, and one or more speakers located at one or more rear passenger locations of the vehicle to play the audio content. In some such embodiments, the audio content delivered using the rear entertainment system is different from audio content delivered to a front portion of the vehicle corresponding to a driver of the vehicle and/or a front passenger.

The control panel 114 may communicate with the processor 106 via a communication line to transmit data to/from the control panel 114, such as for control of other modules or systems of the vehicle control system 100. The control panel includes a touchpad 122 for receiving an input from a user for control of the vehicle control system 100. The touchpad 122 may display virtual buttons that may be touched by the user of the vehicle to control the vehicle control system 100. Additionally or alternatively, the control panel 114 includes other input mechanisms, such as mechanical buttons or other controls (e.g., knobs, switches, etc.) associated with the touchpad 122 to receive inputs for controlling the vehicle control system 100. The control panel 114 may have a dedicated control module or unit configured to process the control inputs and/or to process the data to be displayed on the display device and/or the touchpad 122. Alternatively, such control functions may be processed by the processor 106 (e.g., as part of the controller 118).

The display device 116 may communicate with the processor 106 via a communication line to transmit data to/from the display device 116, such as for display of various information to the user of the vehicle. The display device 116 includes a display screen 124 for displaying information to the user. In one embodiment, the display device 116 is separate from the control panel 114, such as located at a different location in the vehicle. For example, the display screen 124 can be positioned for convenient viewing by the user, and the touchpad 122 can be positioned within a comfortable distance from a hand of the user. The display screen 124 may display different icons, graphics, and the like than the touchpad 122. The virtual buttons on the touchpad 122 may correspond to and be mapped to the display icons on the display screen 124. In another embodiment, the display device 116 is the same as or coupled to the control panel 114. For example, the touchpad 122 is combined with the display screen 124, such as via a touchscreen that functions as both an output device and an input device.

Figure 2:
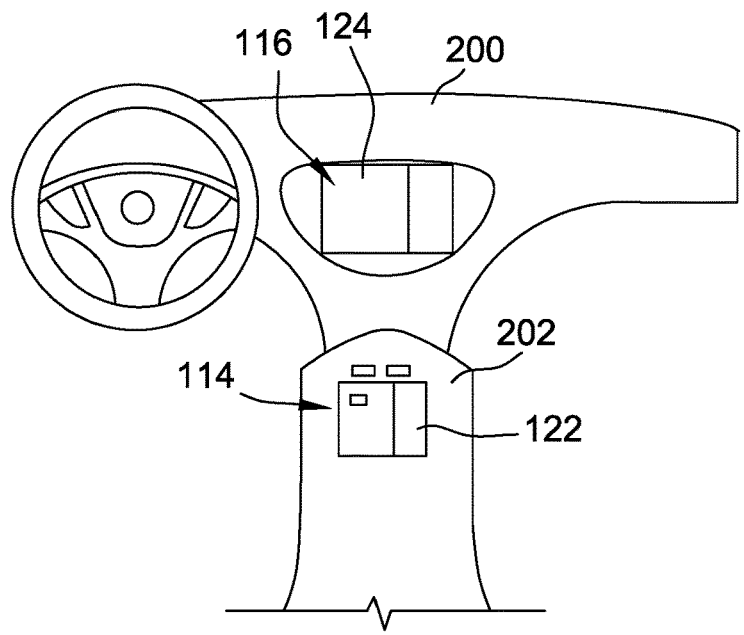
FIG. 2 is a partial schematic view of a vehicle including the vehicle control system shown in FIG. 1 in accordance with an exemplary embodiment.

FIG. 2 is a partial schematic view of a vehicle (e.g., vehicle 300, shown in FIG. 3) including the vehicle control system 100 in accordance with an exemplary embodiment. The vehicle includes a dashboard 200 and a center console 202. In an exemplary embodiment, the display device 116, including the display screen 124, is positioned at a central portion of the dashboard 200 such that a user, or an operator/driver, of a vehicle may easily view the display screen 124 without being distracted from operating the vehicle. The display screen 124 may be located close to eye level such that the user of the vehicle may view the display screen 124 while being able to peripherally view a roadway ahead. In other embodiments, the display screen 124 may be positioned at another location within the vehicle.

The control panel 114 may be located next to the user of the vehicle. The touchpad 122 is positioned to be easily reachable by the user while operating the vehicle. In some embodiments, the control panel 114 may be located in a center console area next to the user. The touchpad 122 enables the user to select icons displayed on the display screen 124 and associated functions.

The control panel 114 is communicatively coupled to the display device 116, as well as the various sub-systems of the vehicle control system 100, such as the vehicle seat haptic system 110, the vehicle entertainment system 112, and the like. For example, the control panel 114, the display device 116 and the components of the sub-systems may be communicatively coupled to the processor 106 (shown in FIG. 1).

The display device 116 may have a home menu or main menu having display icons corresponding to the various sub-systems, such as the vehicle haptic control system 110. The control panel 114 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

It should be understood that in other exemplary embodiments, the control panel 114 is combined with the display device 116, such that the user interacts with (e.g., touches) the display screen 124 directly to select or otherwise manipulate controls or other content displayed thereon, and that the embodiment of FIG. 2 is illustrative only.

Figure 3:
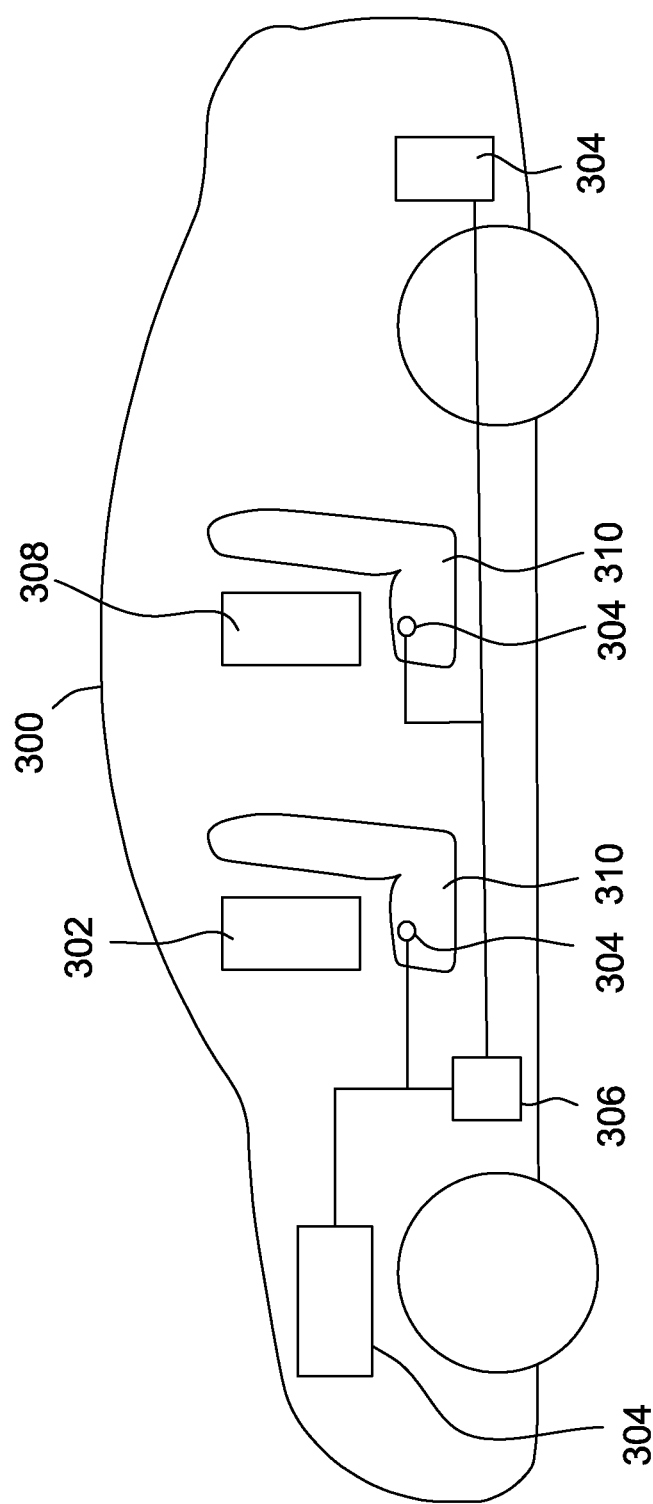
FIG. 3 is a schematic view of an exemplary vehicle including an exemplary vehicle seat haptic system.

FIG. 3 is a schematic view of an exemplary vehicle 300 in which the vehicle control system 100 (shown in FIG. 1) may be implemented. While the vehicle 300 may be an automobile in the exemplary embodiment, in other embodiments, the vehicle 300 may be, but is not limited to, other types of ground craft, aircraft, and watercraft vehicles. The vehicle 300, which may be operated by a driver 302, includes a plurality of sensors 304 and a vehicle controller 306 (which may be the same as the controller 118, shown in FIG. 1). The plurality of sensors 304 may detect the presence and/or position of the driver 302 and one or more passengers 308 in the vehicle 300. In these embodiments, the plurality of sensors 304 may detect the presence of fastened seatbelts, the weight in each seat in vehicle 300, heat signatures, or any other method of detecting information about the driver 302 and passengers 308 in the vehicle 300. The plurality of sensors 304 may also include sensors that detect conditions of and/or operations performed by the vehicle 600, such as velocity, acceleration, braking, and other conditions related to the operation of the vehicle 300.

In the exemplary embodiment, the vehicle 300 includes a plurality of seats 310, each vehicle seat 310 corresponding to a seating location that may be occupied by a user of the vehicle 300 (i.e., the driver 302 or one or more passengers 308). As described further herein, the vehicle seat haptic system 110 (shown in FIG. 1) includes a plurality of actuators (not shown in FIG. 3) positioned in each vehicle seat 310. Each of the actuators is independently controllable by the controller 306 to generate a haptic output in each seat 310 in response to various control conditions. At least some vehicle sensors 304 are employed to detect various characteristics of the vehicle 300 and/or one or more users thereof (i.e., the driver 302 and/or one or more passengers 308). The controller 306 receives sensor data and interprets the sensor data to determine an appropriate haptic output at each vehicle seat 310. The controller 306 also receives user input via the control panel 114 (shown in FIGS. 1 and 2) and incorporates user inputs into the determination of the haptic output at each vehicle seat 310. The controller 306 then transmits a control signal to one or more actuators at one or more of the vehicle seats 310. Receiving the control signal causes the corresponding actuator(s) to generate a haptic output as instructed by the control signal.

Figure 4:
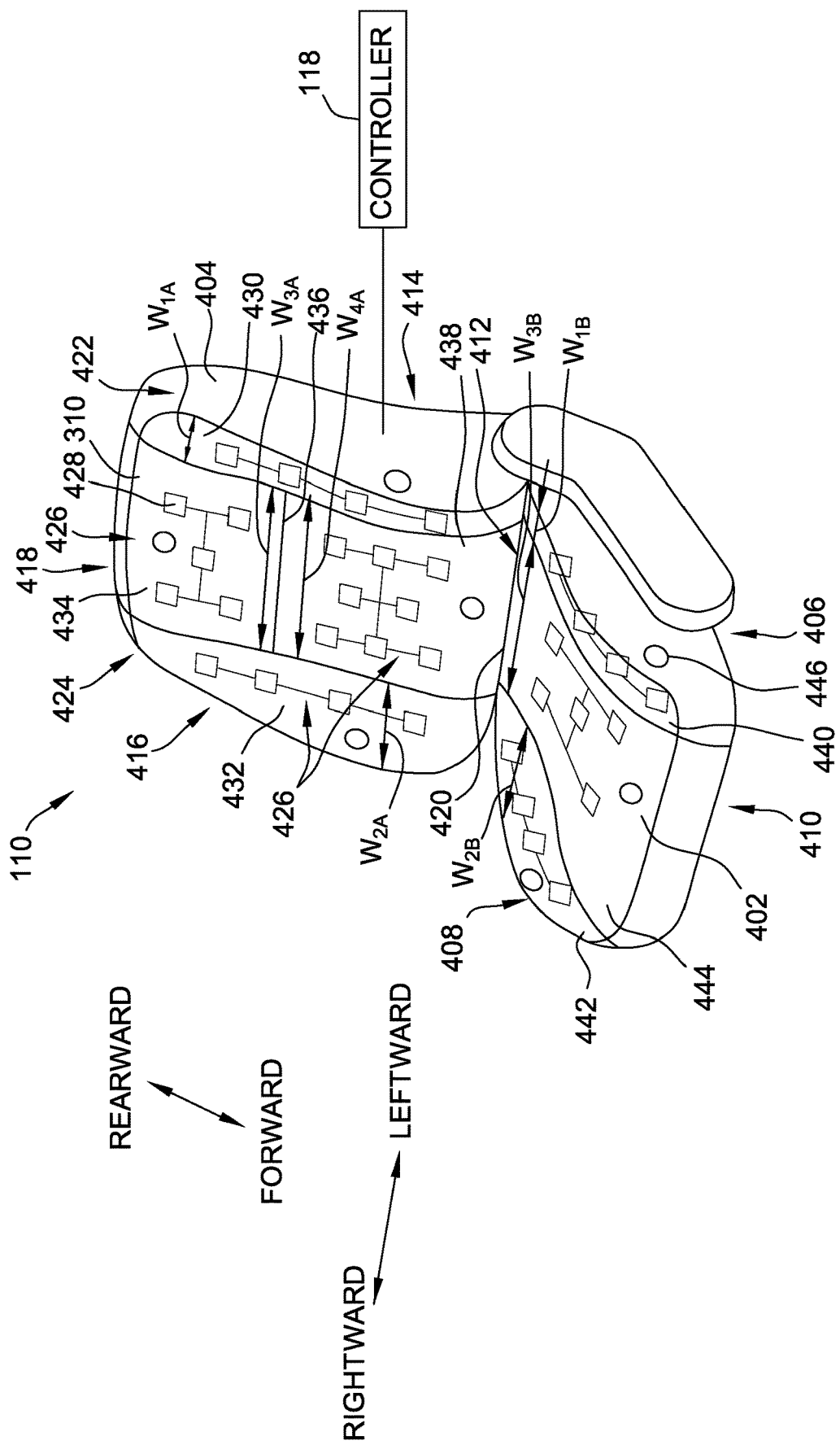
FIG. 4 is a perspective view of an exemplary vehicle seat haptic system suitable for use in the vehicle shown in FIG. 3, the vehicle seat haptic system including a vehicle seat.

FIG. 4 is a perspective view of the vehicle seat haptic system 110 shown in FIG. 1. The vehicle seat haptic system 110 is suitable for use, for example, in the vehicle 300 (shown in FIG. 3). The vehicle seat haptic system 110 includes one or more vehicle seats 310 and the controller 118 (shown in FIG. 1, which may be the same as or substantially equivalent to the controller 306 shown in FIG. 3). The controller 118 is located at any suitable location in the vehicle 300, and is communicatively coupled to components of each vehicle seat 310 (e.g., pressure sensors and/or actuators) to receive input therefrom and/or to transmit control signals thereto. Alternatively, each vehicle seat 310 may include an independent controller 118 communicatively coupled to components thereof and configured to interpret user input and sensor data to generate a control signal for only that vehicle seat 310. The vehicle seat haptic system 110 may include a plurality of vehicle seats 310 such as those shown in FIG. 4 (e.g., individual or "bucket" seats), as well as one or more alternative vehicle seats, such as bench seats.

The vehicle seat 310 includes a base 402 and a back 404. In some embodiment, the vehicle seat 310 also includes a head rest (not shown in FIG. 4). The base 402 extends laterally (i.e., from left to right) from a first side 406 to a second side 408, and longitudinally (i.e., from front to back) from a front 410 to a rear 412. Similarly, the back 404 extends laterally from a first side 414 to a second side 416, and vertically from a top 418 to a bottom 420, where the bottom 420 of the back 404 is adjacent to the rear 412 of the base 402. The base first side 406 and back first side 414 collectively define a first side 422 of the seat 310. Similarly, the base second side 408 and back second side 416 collectively define a second side 424 of the seat 310.

A plurality of discrete haptic zones 426 are defined across the seat base 402 and the seat back 404. Each haptic zone 426 includes one or more actuators 428 therein. Each actuator 428 includes an electrical, mechanical, and/or electro-mechanical actuator 428 suitable to generate a haptic output that is discernible by an occupant of the seat 310. The haptic output may include a vibration, a discrete or individual force output, a motion, a combination thereof, and/or any other suitable haptic output. Suitable actuators 428 include, but are not limited to eccentric rotating mass (ERM) actuators, linear resonant actuators, piezoelectric actuators, and/or any combination thereof.

In the illustrated embodiment, the seat back 404 includes four haptic zones 426. A first haptic zone 430 of the seat back 404 (a first "back haptic zone") extends vertically along the first side 414 of the seat back 404 from the top 418 to the bottom 420 of the seat back 404. A second back haptic zone 432 extends vertically along the second side 416 of the seat back 404 from the top 418 to the bottom 420 of the seat back 404. The first back haptic zone 430 has a width $W_{1A}$, and the second back haptic zone 432 has a width $W_{2A}$ that is approximately equal to with $W_{1A}$. A third back haptic zone 434 extends from the top 418 of the seat back 404 towards the bottom 420 of the seat back 404, between the first and second back haptic zones 430, 432, to a midline 436 of the seat back 404. The third back haptic zone 434 has a width $W_{3A}$ that is generally wider than width $W_{1A}$ and width $W_{2A}$. A fourth back haptic zone 438 extends from the bottom 420 of the seat back 404 towards the top 418 of seat back 404, between the first and second back haptic zones 430, 432, to the midline 436 of the seat back 404 such that the fourth back haptic zone 438 abuts the third back haptic zone 434. The fourth back haptic zone 438 has a width $W_{4A}$ that is generally wider than width $W_{1A}$ and width $W_{2A}$. The midline 436 of the seat back 404 may be approximately halfway between the top 418 and the bottom 420 of the seat back 404, or may be otherwise located between the top 418 and bottom 420 of the seat back 404 to define a boundary between the third and fourth back haptic zones 434, 438.

In addition, the seat base 402 includes three haptic zones 426. A first haptic zone 440 of the seat base 402 (a first "base haptic zone") extends longitudinally along the first side 406 of the seat base 402 from the front 410 to the rear 412 of the seat base 402. A second base haptic zone 442 extends longitudinally along the second side 408 of the seat base 402 from the front 410 to the rear 412 of the seat base 402. The first base haptic zone 440 has a width $W_{1B}$, and the second base haptic zone 442 has a width $W_{2B}$ that is approximately equal to width $W_{1B}$. A third base haptic zone 444 extends longitudinally from the front 410 to the rear 412 of the seat base 402, between the first and second base haptic zones 440, 442. The third base haptic zone 444 has a width $W_{3B}$ that is wider than width $W_{1B}$.

As used herein with reference to haptic zones, the term "discrete" refers to haptic zones that are configured such that each haptic zone is individually perceivable or distinguishable from adjacent haptic zones. One or more actuators 428 associated with each haptic zone 426 may be positioned (i.e., within vehicle seat 310) and/or actuated to produce discrete haptic zones. In the exemplary embodiment, each haptic zone 426 is defined by a plurality of actuators 428 that are networked together and configured to be actuated in unison with respect to both timing and magnitude. However, individual actuators 428 within a zone may still be actuated independently from one another to provide discrete haptic zones in addition to those labeled in FIG. 4. It should be readily understood that, in other embodiments, there may be additional haptic zones 426, fewer haptic zones 426, and/or haptic zones 426 having different dimensions, shapes, orientations, configurations, and/or positions than those shown in FIG. 4 without departing from the scope of the present disclosure. For instance, it is contemplated that a vehicle seat 310 may include haptic zones 426 with respective actuators in armrests, a headrest, a calf area, and/or a foot rest or floor area surrounding the vehicle seat 310 (not shown in FIG. 4).

Each actuator 428 is communicatively coupled to the controller 118 and is independently controllable thereby to generate a haptic output in response to a control signal from the controller 118. Accordingly, certain actuators 428 may be controlled to generate a haptic output, also referred to as "activating" an actuator 428, while one or more other actuators 428 remain "deactivated" or "idle," and do not generate a haptic output.

In the exemplary embodiment, the controller 118 generates the control signal to cause the actuators 428 to generate the haptic output based on an audio output from the vehicle entertainment system 112 (shown in FIG. 1). The controller 118 causes the actuators 428 to activate and/or deactivate to generate the haptic output that corresponds to a volume of the audio output, a frequency of the audio output, a balance (left-to-right) of the audio output, a fade (front-to-back) of the audio output, and/or other characteristics of the audio output (e.g., a level of treble and/or bass).

Additionally or alternatively, the controller 118 generates the control signal to cause the actuators 428 to generate the haptic output in response to one or more vehicle operations or conditions of the vehicle 300. For instance, the controller 118 generates the control signal to cause the actuators 428 to generate haptic output indicative of a turn signal operation, a blind spot alert, a lane change operation, an acceleration operation, a braking operation, and/or a backseat load alert (colloquially referred to as "child-left-in-seat" alert). In some such embodiments, the controller 118 only causes haptic output in response to a vehicle operation to be generated at the driver's vehicle seat 310, as such information may not be relevant to one or more passengers in the vehicle 300. The controller 118 may interrupt a haptic output generated corresponding to the audio output to cause generation of a haptic output corresponding to the vehicle operation(s), at the driver's seat 310, while maintaining the haptic output generated corresponding to the audio output at the vehicle seat(s) 310 of one or more passengers of the vehicle 300.

In addition, as described further herein, the controller 118 receives user input from a user of a vehicle seat 310 that indicates user preferences or settings for the haptic output. The controller 118 incorporates the user settings for a seat 310 in generating the control signal causing the haptic output generated at that seat 310 by the plurality of actuators 428.

In the exemplary embodiment, the controller 118 generates the control signal to cause the actuators 428 to generate the haptic output (corresponding to the audio output or the vehicle operation) based on a position of the user in the vehicle seat 310. Based on the user's position, the controller 118 generates a control signal that causes the actuators 428 to generate an asynchronous and/or otherwise variable haptic output across the vehicle seat 310. As used herein, "asynchronous" haptic output refers to active (i.e., non-zero) haptic output that is out of sync from one haptic zone 426 to another or within a haptic zone 426. "Variable" haptic output refers to haptic output that has variable magnitude (also referred to interchangeably as a level or intensity) from one haptic zone 426 to another or within a haptic zone 426. A haptic output may therefore be asynchronous and invariable (i.e., out of sync, but at the same magnitude), synchronous and variable (i.e., in sync, but at varying magnitudes), and/or asynchronous and variable (out of sync, and at varying magnitudes) across the vehicle seat 310. The intensity may vary or lack synchronization side-to-side (e.g., left-to-right or right-to-left), up-and-down, or randomly across the vehicle seat 310. The lack of synchronization and/or the variability of a haptic output may be effected across the seat 310 with each haptic zone 426 controlled individually (i.e., "zone-level" haptic output control) and/or across a haptic zone 426 with each actuator 428 therein controlled individually (i.e., "actuator-level" haptic output control). In other words, the magnitude and/or synchronization of haptic output within a haptic zone 426 may vary.

In some embodiments, this creates an effect of "movement" across the vehicle seat 310. For example, in response to a driver leaning to one side, the controller 118 generates a control signal causing the actuators 428 to generate an asynchronous and/or variable haptic output from that side to the other side, creating an effect of movement to encourage the driver to sit upright.

In other embodiments, this creates a more desirable user experience. For example, in response to a passenger leaning to one side in a vehicle seat 310, the controller 118 generates a control signal causing the actuators 428 to generate a variable haptic output with lower intensity levels on the side to which the user is leaning, and greater intensity levels on the other side of the vehicle seat 310. This variable haptic output generated by the actuators 428 facilitates creating a more evenly felt haptic output for the user.

In other embodiments, the asynchronization and/or variability of the haptic output form side-to-side across the vehicle seat 310 creates a "surround sound"-like haptic experience. While watching video content (e.g., movies) with corresponding audio output, the vehicle seat haptic system 110 is configured to generate a haptic output solely on the first or second side 422, 424 of the vehicle seat 310, or any other haptic output synchronization with the video and/or audio content. For example, if an explosive is set off on the right side of a screen in a movie, then the controller 118 is configured to generate a control signal causing the actuators 428 to generate a haptic output with a high intensity on the second (right) side 424 of the vehicle seat, and to generate a haptic output having low intensity (or to generate no haptic output) on the left (first) side 422. As another example, if a military jet is shown to fly across the screen, the controller 118 generates a control signal causing the actuators 428 to generate a haptic output that mirrors the flight path of the jet across the vehicle seat 310.

In other embodiments, the asynchronization and/or variability of the haptic output form side-to-side across the vehicle seat 310 is used for various safety features, such as to implement a direction cue directing the user's attention in a direction indicated by the haptic output (e.g., left-to-right). For example, the controller 118 is configured to generate a control signal causing the actuators 428 to generate an on-and-off cycling haptic output with increasing intensity towards one side 422, 424 of the vehicle seat 310 as the vehicle 300 drifts towards or over a lane marker on the corresponding side of the vehicle 300.

In the exemplary embodiment, each vehicle seat 310 also includes a plurality of pressure sensors 446 to facilitate detecting the position of a user in a particular vehicle seat 310. The pressure sensors 446 generate pressure sensor data indicative of the pressure exerted by the user on the various components of the vehicle seat 310 (e.g., on the haptic zones 426). The pressure sensor data is transmitted to the controller 118. The controller 118 receives the pressure sensor data, and processes or interprets the pressure sensor data to determine the position of the user in the seat 310. The controller 118 then generates the control signal for transmission to the actuators 428 based on the determined position. The vehicle 300 may include one or more other sensors to facilitate determining the position of the user in the seat 310, such as one or more cameras, accelerometers, motion detectors, and/or any other suitable sensors.

Figure 5:
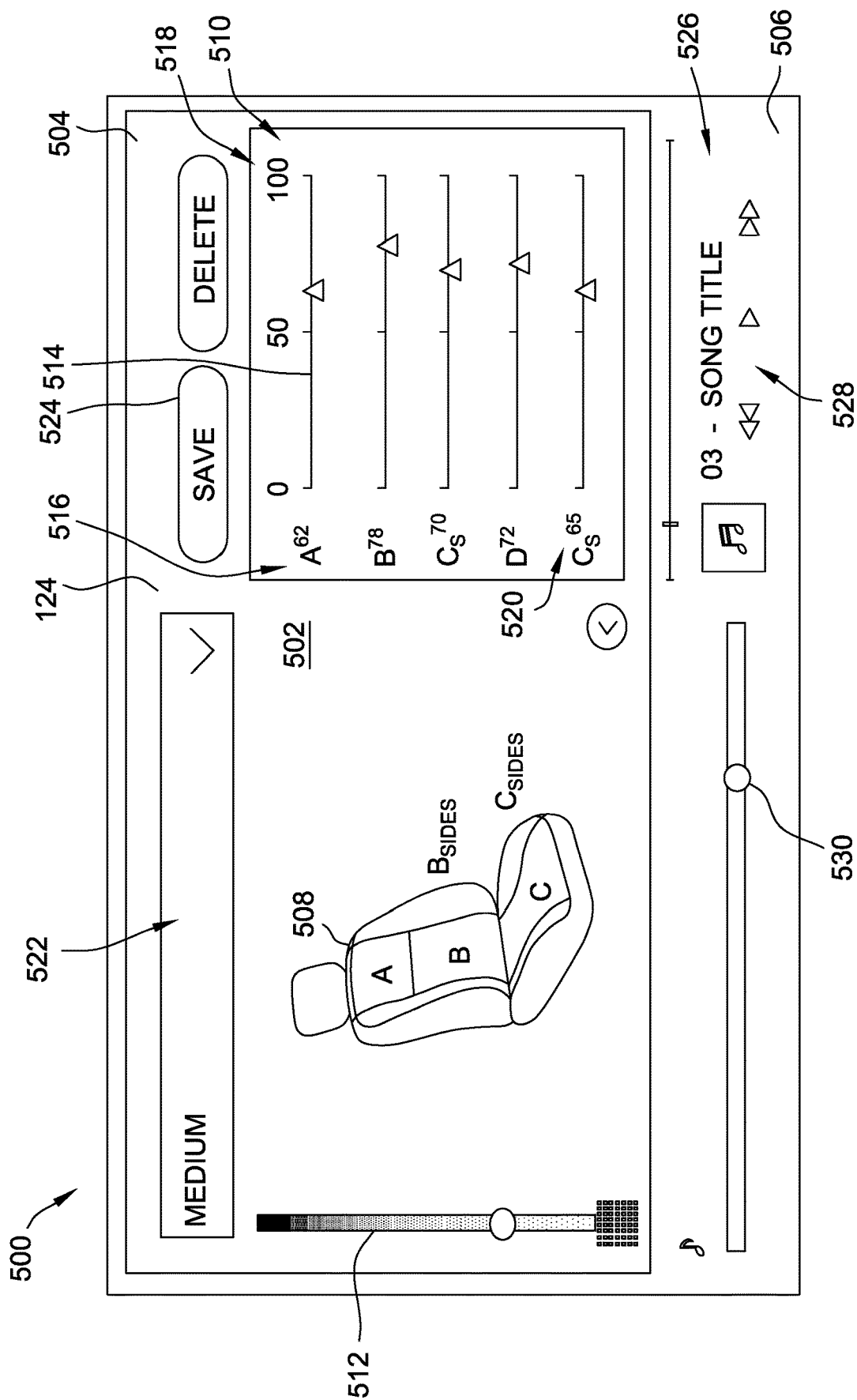
FIG. 5 illustrates a display screen showing an exemplary haptic control interface.

FIG. 5 is a view 500 of an exemplary user interface 502 displayed on the display screen 124 of the vehicle control system 100 shown in FIG. 1. A user of the vehicle 300 (shown in FIG. 3) may input controls, preferences, settings, or other user input data with the user interface 502. In one embodiment, the view 500 is displayed on display screen 124, which is positioned in the dashboard 200 of the vehicle 300, as shown in FIG. 2. Additionally or alternatively, each vehicle seat 310 may have an associated display screen 124 at a location thereby. For instance, each rear vehicle seat 310 may have an associated display screen 124 located in the seat back 404 of the vehicle seat 310 in front of it.

The user interface 502 includes a haptic control portion 504 and a vehicle entertainment control portion 506 (generally, first and second control portions). The haptic control display portion 504 depicts an illustration of a vehicle seat 508 with haptic zones labeled "A", "B", "$B_{sides}$", "C", and "$C_{sides}$". In the illustrated embodiment, the third back haptic zone 434 corresponds to zone "A," the fourth back haptic zone 438 corresponds to zone "B," the first and second back haptic zones 430, 432 correspond to zones "$B_{sides}$," the third base haptic zone 444 corresponds to zone "C," and the first and second base haptic zones 440, 442 correspond to zones "$C_{sides}$." It should be readily understood that the haptic zones 426 on the illustrated vehicle seat 508 may be alternatively labeled without departing from the scope of the present disclosure. Where one display screen 124 is used to input user preferences or settings for a plurality of vehicle seats 310, the displayed illustrated vehicle seat 508 may be labeled or otherwise identified. Each individual vehicle seat may be selected using a drop down list, one or more scrolling controls (e.g., left and right arrows), selecting the seat from an illustration or graphical representation of the vehicle 300 (not shown), or using any other suitable method.

The haptic control portion 504 also includes a plurality of user input controls 510 including a master haptic magnitude control 512 and individual zone haptic magnitude controls 514. The master haptic magnitude control 512 is embodied as a slider control, and is referred to herein as a "master slider." A user manipulates the master slider 512 to input a preferred magnitude of haptic output to be generated at the vehicle seat 310 corresponding to the displayed illustrated vehicle seat 508. In the illustrated embodiment, the master slider 512 is shaded or has a gradated color to easily indicate a higher magnitude of haptic output (e.g., darker color or shade) and a lower magnitude of haptic output (e.g., lighter color or shade). Additionally or alternatively, a legend or labeled intervals are provided adjacent the master slider 512 to identify the varying haptic magnitudes available.

Individual zone haptic magnitude controls 514 are embodied as slider controls, and are referred to herein as "individual zone sliders." Each individual zone slider 514 is labeled with a slider label 516 to identify the particular haptic zone 426 (A, B, C, $B_{sides}$, $C_{sides}$) corresponding to each individual zone slider 514. The individual zone sliders 514 are labeled with intervals 518 identifying the magnitude of the haptic output in each corresponding zone 426. Additionally, a numerical indicator 520 is displayed adjacent to each slider label 516 to numerically indicate the current haptic output magnitude selected for the corresponding haptic zone. The individual zone sliders 514 can be manipulated by a user (e.g., using touchpad 122) to select a preferred magnitude of haptic output to be generated at each corresponding haptic zone 426.

In the exemplary embodiment, manipulation of the master slider 512 causes a corresponding adjustment in every individual zone slider 514, increasing or decreasing the magnitude of haptic output at all individual zones 426 equally. In other words, as the master slider 512 is moved up or down, all of the individual zone sliders 514 are moved left or right by a corresponding amount.

The user interface 502 may include one or more controls to turn a particular haptic zone 426 on or off. For example, in the illustrated embodiment, individual haptic zones 426 may be turned on or off by a user selecting (e.g., with touchpad 122) one of the haptic zones on the illustration of the selected seat 508 displayed on the user interface 502. A user with lower back pain, for instance, may select the "B" haptic zone, or the fourth back haptic zone 438, to turn that haptic zone off. The controller 118 receives this user input, and generates or otherwise modifies control signals output by the controller 118 to the plurality of actuators 428 such that the actuator(s) 428 in the "B" haptic zone are not activated.

The user interface 502 also includes a drop-down menu 522 including a plurality of saved or pre-configured haptic output states for the illustrated vehicle seat 508. When one of the saved or pre-configured haptic output states are selected by a user, all of the sliders 512, 514 are automatically positioned at intensity or magnitude levels that correspond to the selected pre-configured haptic output state. In the illustrated embodiment, for example, a "Medium" saved haptic output state is selected, and all of the sliders 512, 514 are automatically positioned at levels corresponding to the "medium" saved haptic output state. A user may manipulate one or more controls 510 on the display screen 124 to adjust the intensity of the haptic output at one or more haptic zones 426, and/or to turn one or more haptic zones 426 on or off. The user may then select a "Save" control 524 to save the entire set of settings, as adjusted and selected by the user. Selection of the "Save" control 524 may cause the controller 118 to overwrite a currently selected pre-configured haptic output state, or may prompt the user to create a new pre-configured haptic output state corresponding to the user's selections.

The vehicle entertainment control portion 506 of the user interface 502 includes an indicator 526 of current audio playback, audio content manipulation controls 528 (e.g., a play/pause control, a skip control, etc.), and an audio output volume control 530. In the exemplary embodiment, a user may manipulate the audio output volume control 530 to adjust the volume of the audio output in a location corresponding to their vehicle seat 310. Where the user interface 502 is displayed to the driver (e.g., in the dashboard 200 of the vehicle 300), manipulation of the audio output volume control 530 may cause the volume level throughout the vehicle 300 to change accordingly. In other words, such a control may be a "master" volume control 530. In some embodiments, increasing the volume of the audio output at an individual seat 310 increases the overall magnitude of the haptic output at that seat 310, and decreasing the volume decreases the overall magnitude of the haptic output. In other embodiments, manipulating the volume of the audio output does not affect the haptic output at a vehicle seat.

Figure 6:
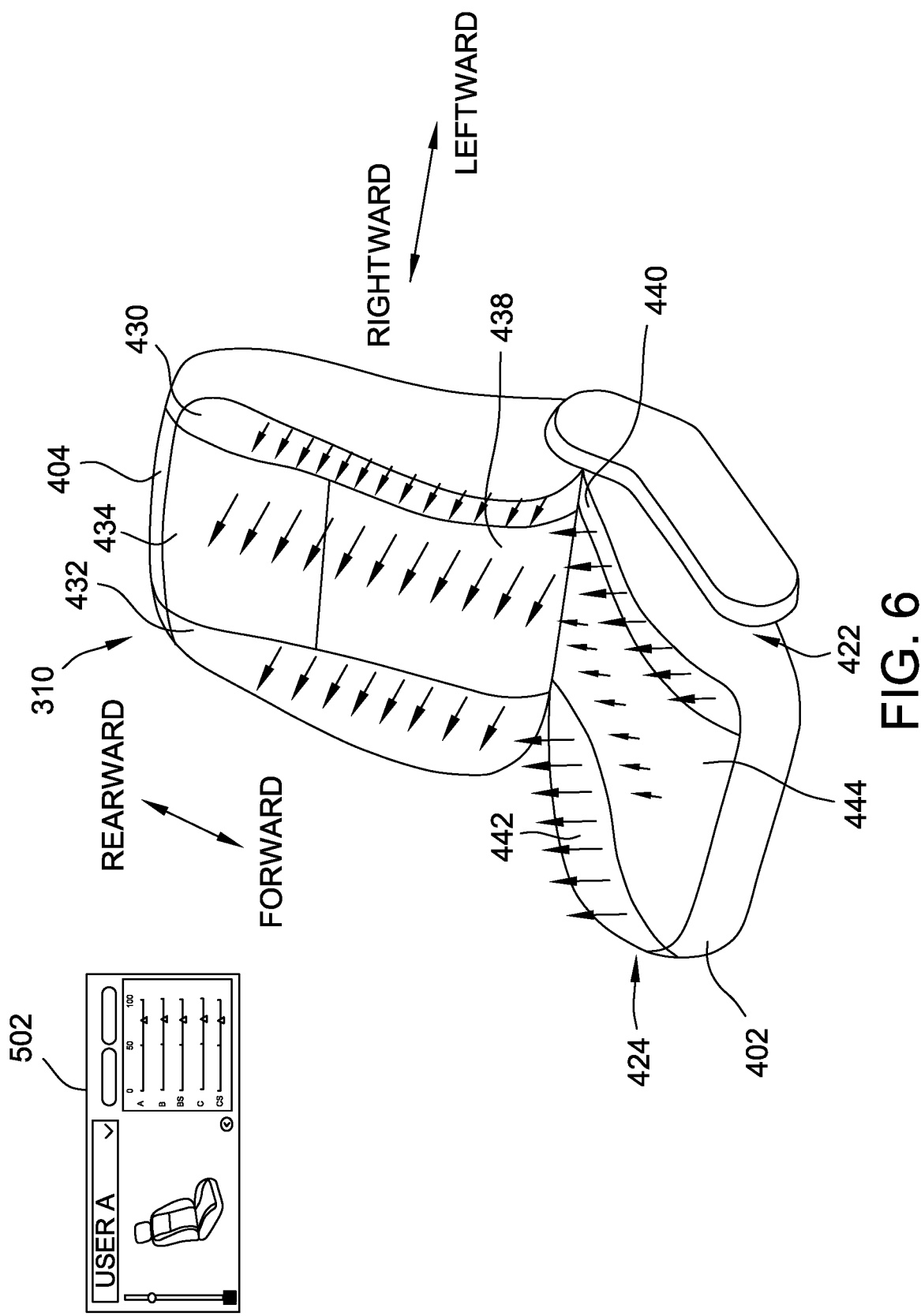
FIG. 6 is a perspective view of the vehicle seat shown in FIG. 4, illustrating an exemplary haptic output at the vehicle seat.
Figure 7:
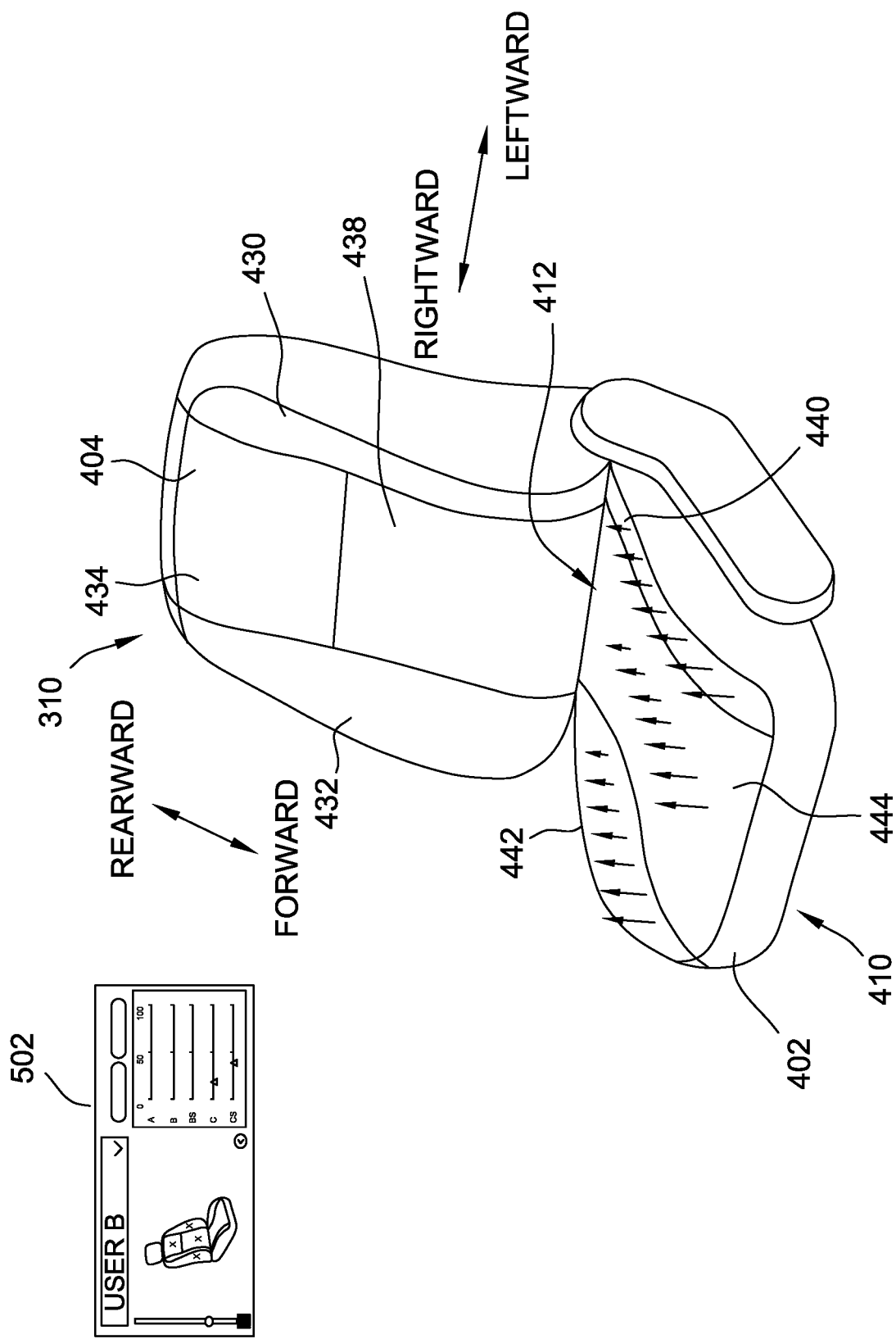
FIG. 7 is another perspective view of the vehicle seat shown in FIG. 4, illustrating another exemplary haptic output at the vehicle seat.

FIGS. 6 and 7 are perspective views of the vehicle seat 310 shown in FIG. 4 illustrating exemplary haptic outputs at the haptic zones 426 across the vehicle seat 310, along with the views of the user interface 502 that correspond to the illustrated haptic outputs. The haptic outputs in FIGS. 6 and 7 are shown by arrows, where the length and size of each arrow represents the magnitude of haptic output at that location (i.e., a larger and longer arrow represents a higher-magnitude output).

FIG. 6 illustrates a haptic output state in which a user A (e.g., a driver, not shown) is leaning to the right, and thus exerting relatively more pressure on the right side of the seat 310 (i.e., second side 424) than the left side of the seat 310 (i.e., first side 422). The controller 118 (shown in FIG. 1) generates a control signal that is transmitted to the actuators 428 (shown in FIG. 4) in the vehicle seat 310 based on the user's position in the seat 310. With reference to the seat back 404, the actuators 428 in the second back haptic zone 432 are generating a mid-level haptic output, the actuators 428 in the third and fourth back haptic zones 434, 438 are generating a high-level haptic output, and the actuators 428 in the first back haptic zone 430 are generating a low-level haptic output. With reference to the seat base 402, the actuators 428 in the second base haptic zone 442 are generating a high-level haptic output, the actuators 428 in the third base haptic zone 444 are generating a low-level haptic output, and the actuators 428 in the first base haptic zone 440 are generating a mid-level haptic output. The actuators 428 may also generate the haptic output asynchronously across the vehicle seat 310. For example, the actuators 428 in the second back haptic zone 432, the actuators 428 in the third and fourth back haptic zones 434, 438, and the actuators 428 in the first back haptic zone 430 may be sequentially activated out-of-sync from one another by a pre-determined offset (e.g., 0.5 seconds). This may create an effect of a wave-like movement across the vehicle seat 310 from right to left (i.e., from the second side 424 of the seat 310 to the first side 422 of the vehicle seat 310) to encourage the user to sit upright. The haptic output from the actuators 428 may also vary over time. According to the preferences in the user A saved haptic state displayed on the user interface 502, the magnitude of the haptic output of the actuators 428 is relatively high, and all haptic zones 426 are active.

FIG. 7 illustrates a haptic output state in which a user B is leaning forward, and thus exerting relatively more pressure on the front 410 of the seat base 402 than the rear 412 of the seat base 402. The controller 118 generates a control signal that is transmitted to the actuators 428 in the vehicle seat 310 based on the user's position in the seat 310. With reference to the seat back 404, none of the actuators 428 are generating a haptic output. With reference to the seat base 402, the actuators 428 in all of the base haptic zones 440, 442, 444 are generating a haptic output that decreases in magnitude from the front 410 of the base 402 to the rear 412 of the base 402, based on the user's position in the seat 310. The actuators 428 may also generate the haptic output asynchronously across the vehicle seat 310. For example, the actuators 428 in the seat base 402 may be sequentially activated out-of-sync from one another from the forward-most actuators 428 (i.e., the actuators 428 positioned closest to the front 410 of the seat base 402) to the rearward most actuators 428 (i.e., the actuators 428 positioned closest to the rear 412 of the seat base 402) by a pre-determined offset (e.g., 0.5 seconds). This may create an effect of a wave-like movement across the vehicle seat 310 from the front 410 of the seat base 402 to the rear 412 of the seat base to encourage the user to sit upright. According to the preferences in the user B saved haptic state displayed on the user interface 502, the magnitude of the haptic output of the actuators 428 is relatively low. All of the back haptic zones 430, 432, 434, 438 are turned off or deactivated. The magnitude of the haptic output at the "C" haptic zone, or the third base haptic zone 444, is less than the magnitude of the haptic output at the "$C_{sides}$" haptic zones, or the first and second base haptic zones 440, 442.

Figure 8:
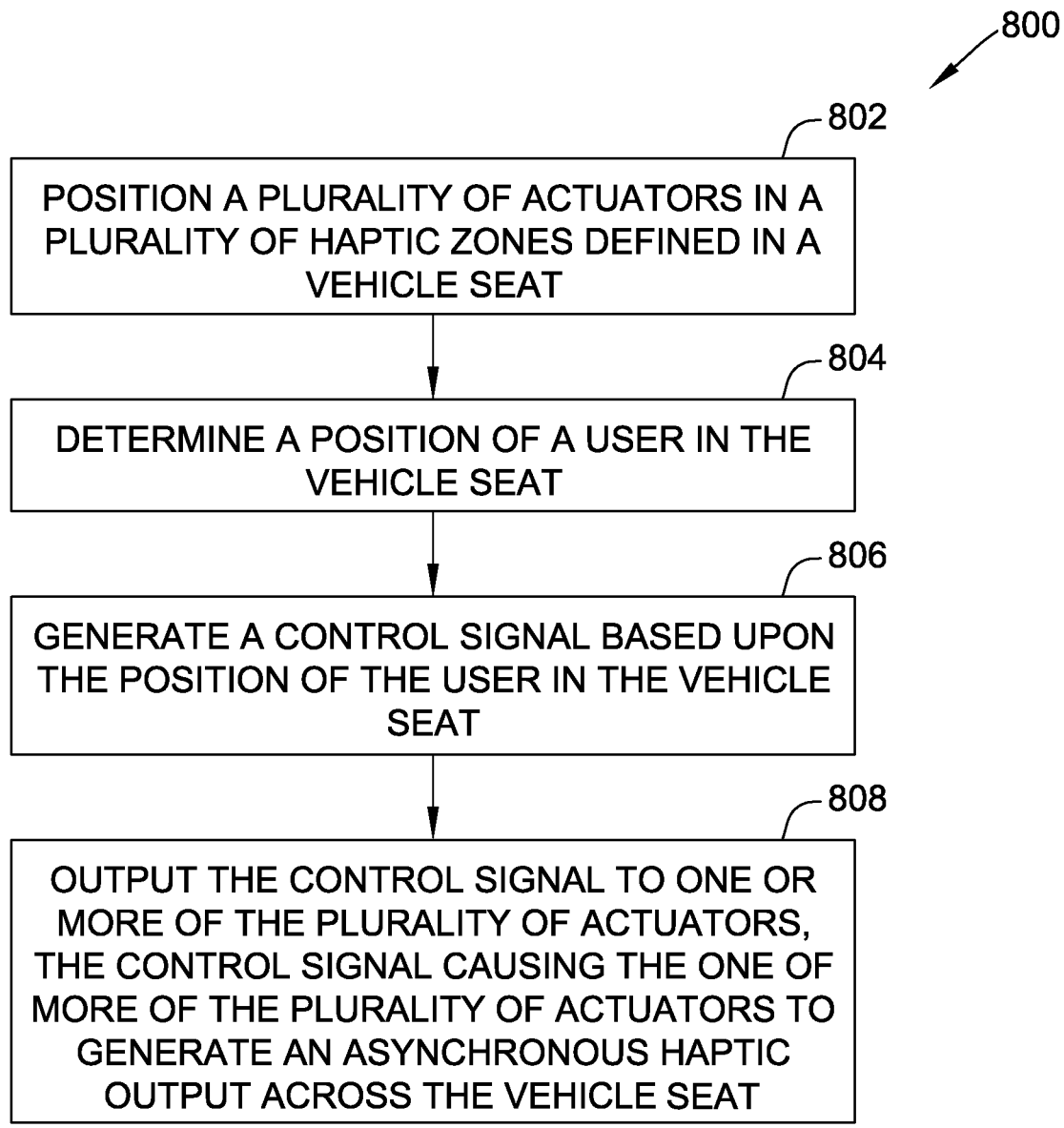
FIG. 8 is a flow chart of an exemplary method of generating a haptic output at the vehicle seat shown in FIG. 4.

FIG. 8 is a flow chart of an exemplary method 800 for generating a haptic output in a vehicle seat. In the exemplary embodiment, the method 800 is performed by the controller 118 (shown in FIG. 1).

In the exemplary embodiment, the method 800 includes positioning 802 a plurality of actuators (e.g., the actuators 428, shown in FIG. 4) in a plurality of discrete haptic zones (e.g., the haptic zones 426, also shown in FIG. 4) defined in a vehicle seat (e.g., the vehicle seat 310, shown in FIGS. 3 and 4).

The method 800 also includes determining 804, by the controller, a position of a user (e.g., a driver or passenger) in the vehicle seat. In some embodiments, the method 800 includes positioning a plurality of pressure sensors (e.g., the pressure sensors 446, shown in FIG. 4) in the plurality of haptic zones, and receiving, by the controller from the plurality of pressure sensors, pressure sensor data. In such embodiments, the determining 804 also includes determining the position of the user in the vehicle seat based upon the pressure sensor data.

The method 800 also includes generating 806, by the controller, a control signal based upon the position of the user in the vehicle seat. In some embodiments, the generating 806 includes generating a variable haptic output across the plurality of haptic zones from a first haptic zone on a first side of the vehicle seat to a second haptic zone on a second side of the vehicle seat based on the position of the user. In some embodiments, the generating 806 includes generating the control signal based upon an audio output from a vehicle entertainment system (e.g., the vehicle entertainment system 112, shown in FIG. 1). In some embodiments, the generating 806 includes generating the control signal based upon a vehicle operation of a vehicle in which the vehicle seat is installed. The vehicle operation may include at least one of a turn signal operation, a blind spot alert, a lane change operation, an acceleration operation, a braking operation, and a backseat load alert.

The method 800 still further includes outputting 808, by the controller, the control signal to one or more of the plurality of actuators, the control signal causing the one or more of the plurality of actuators to generate an asynchronous haptic output across the vehicle seat.

Embodiments of the vehicle seat haptic systems described herein facilitate increasing the flexibility and variability of haptic output provided to a user. Haptic output provides a more direct communication to a user through the sense of touch, which may be detected faster than a visual communication alone. The vehicle seat haptic system described herein facilitates generating asynchronous and/or variable haptic output, and facilitates incorporating user preferences while determining a haptic output to generate. As such, the vehicle seat haptic system facilitates improved and more effective communication of information to the user of the vehicle. A user is able to look in a direction and listen to media freely and still receive and interpret a haptic output from the vehicle seat without interference. The vehicle seat haptic system also incorporates varying frequency and/or magnitude of haptic output to improve the flexibility and precision of communication (e.g., of notifications, alerts) to the user.

The methods and system described herein may be implemented using computer programming or engineering techniques including computer software, firmware, hardware, or any combination or subset. Some technical problems with known systems include (a) a need to facilitate communicating information effectively a user, such as a driver; and (b) increasing variability and flexibility in haptic outputs in response to various control conditions. Embodiments of the systems and methods described herein address such technical problems. The technical effect of at least some embodiments of the systems and processes described herein is achieved by performing at least one of the following steps: (a) positioning a plurality of actuators in a plurality of discrete haptic zones defined in a vehicle seat; (b) determining a position of a user in the vehicle seat; (c) generating a control signal based upon the position of the user in the vehicle seat; and (d) outputting the control signal to one or more of the plurality of actuators, the control signal causing the one or more of the plurality of actuators to generate an asynchronous haptic output across the vehicle seat. The resulting technical effect is that a vehicle seat is provided with more effective and flexible haptic output systems.

In some embodiments, the technical effect is also achieved by: (e) positioning a plurality of pressure sensors in the plurality of haptic zones; (f) receiving, from the plurality of pressure sensors, pressure sensor data; (g) determining, based upon the pressure sensor data, the position of the user in the vehicle seat; (h) generating the control signal to instruct the plurality of actuators to generate the haptic output asynchronously across the plurality of haptic zones based on the position of the user; and/or (i) generating the control signal to instruct the plurality of actuators to generate the haptic output variably across the plurality of haptic zones from a first haptic zone on a first side of the vehicle seat to a second haptic zone on a second side of the vehicle seat based on the position of the user.

One or more embodiments include a system, which may be implemented as a programmable logic controller (PLC), also referred to as a programmable logic circuit or simply "controller," that controls various functions and operations of the vehicle, such as a vehicle haptic system, a vehicle entertainment system, and the like. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A vehicle seat haptic system comprising:
   a vehicle seat comprising:
      a plurality of discrete haptic zones defined across the vehicle seat; and
      a plurality of actuators positioned in the plurality of haptic zones and configured to generate a haptic output; and
   a controller communicatively coupled to the plurality of actuators and configured to:
      determine a position of a user in the vehicle seat;
      determine at least one characteristic of an asynchronous vibratory haptic output, to be generated by one or more of the plurality of actuators across the vehicle seat, based upon the position of the user in the vehicle seat, the at least one characteristic including one or more of an intensity, a direction, a location, and a frequency of the asynchronous vibratory haptic output and
      output a control signal to the one or more of the plurality of actuators to generate the asynchronous vibratory haptic output across the vehicle seat.

2. The vehicle seat haptic system of claim 1, wherein the vehicle seat further comprises a plurality of pressure sensors positioned in the plurality of haptic zones and configured to sense pressure exerted by the user in one or more of the plurality of haptic zones.

3. The vehicle seat haptic system of claim 2, wherein the controller is further configured to:
   receive pressure sensor data from the plurality of pressure sensors;
   determine the position of the user in the vehicle seat based on the pressure sensor data, the position of the user including a leaning direction of the user; and
   output the control signal to the one or more of the plurality of actuators based upon the determined leaning direction of the user.

4. The vehicle seat haptic system of claim 1, wherein the vehicle seat further comprises a seat base and a seat back, wherein the plurality of haptic zones are defined across each of the seat base and the seat back.

5. The vehicle seat haptic system of claim 1, wherein the controller is further configured to output the control signal to the one or more of the plurality of actuators to generate a variable vibratory haptic output across the plurality of haptic zones from a first haptic zone on a first side of the vehicle seat to a second haptic zone on a second side of the vehicle seat, based on the position of the user in the vehicle seat.

6. The vehicle seat haptic system of claim 1, wherein the controller is further configured to generate the control signal based upon an audio output from a vehicle entertainment system.

7. The vehicle seat haptic system of claim 1, wherein the controller is further configured to:

detect a vehicle operation of a vehicle in which the vehicle seat is installed; and generate the control signal based upon the detected vehicle operation.

8. The vehicle seat haptic system of claim 7, wherein the vehicle operation includes at least one of a turn signal operation, a blind spot alert, a lane change operation, an acceleration operation, a braking operation, and a backseat load alert.

9. A vehicle seat haptic system comprising:
a plurality of actuators positioned in a plurality of discrete haptic zones defined in a vehicle seat, the plurality of actuators configured to generate a vibratory haptic output in the plurality of haptic zones; and
a controller communicatively coupled to the plurality of actuators and configured to:
determine a position of a user in the vehicle seat
determine at least one characteristic of an asynchronous vibratory haptic output, to be generated by one or more of the plurality of actuators across the vehicle seat, based upon the position of the user in the vehicle seat, the at least one characteristic including one or more of an intensity, a direction, a location, and a frequency of the asynchronous vibratory haptic output;
generate a control signal for one or more of the plurality of actuators to generate the asynchronous vibratory haptic output; and
output the control signal to the one or more of the plurality of actuators to generate the asynchronous vibratory haptic output across the vehicle seat.

10. The vehicle seat haptic system of claim 9 further comprising a plurality of pressure sensors positioned in the plurality of haptic zones and configured to sense pressure exerted by the user in one or more of the plurality of haptic zones.

11. The vehicle seat haptic system of claim 10, wherein the controller is further configured to:
receive pressure sensor data from the plurality of pressure sensors;
determine the position of the user in the vehicle seat based on the pressure sensor data, the position of the user including a leaning direction of the user; and
output the control signal to the one or more of the plurality of actuators based upon the determined leaning direction of the user.

12. The vehicle seat haptic system of claim 9, wherein the controller is further configured to output the control signal to the one or more of the plurality of actuators to generate a variable vibratory haptic output across the plurality of haptic zones from a first haptic zone on a first side of the vehicle seat to a second haptic zone on a second side of the vehicle seat, based on the position of the user.

13. The vehicle seat haptic system of claim 9, wherein the controller is further configured to generate the control signal based upon an audio output from a vehicle entertainment system communicatively coupled to the controller.

14. The vehicle seat haptic system of claim 9, wherein the controller is further configured to:
detect a vehicle operation of a vehicle in which the vehicle seat haptic system is installed; and generate the control signal based upon on the detected vehicle operation.

15. The vehicle seat haptic system of claim 14, wherein the vehicle operation includes at least one of a turn signal operation, a blind spot alert, a lane change operation, an acceleration operation, a braking operation, and a backseat load alert.

16. A method of generating a haptic output comprising:
positioning a plurality of actuators in a plurality of discrete haptic zones defined in a vehicle seat;
determining, by a controller, a position of a user in the vehicle seat;
determining, by the controller, at least one characteristic of an asynchronous vibratory haptic output, to be generated by one or more of the plurality of actuators across the vehicle seat, based upon the position of the user in the vehicle seat, the at least one characteristic including one or more of an intensity, a direction, a location, and a frequency of the asynchronous vibratory haptic output; and
outputting, by the controller, a control signal to the one or more of the plurality of actuators, the control signal causing the one or more of the plurality of actuators to generate the asynchronous vibratory haptic output across the vehicle seat.

17. The method of claim 16, further comprising:
positioning a plurality of pressure sensors in the plurality of haptic zones; and
receiving, from the plurality of pressure sensors, pressure sensor data,
wherein said determining a position of a user in the vehicle seat comprises determining the position of the user in the vehicle seat based upon the pressure sensor data, the position of the user including a leaning direction of the user, and
wherein outputting the control signal comprises outputting the control signal to the one or more of the plurality of actuators based upon the determined leaning direction of the user.

18. The method of claim 16, further comprising generating the control signal to generate a variable vibratory haptic output across the plurality of haptic zones from a first haptic zone on a first side of the vehicle seat to a second haptic zone on a second side of the vehicle seat based on the position of the user.

19. The method of claim 16, further comprising generating the control signal based upon an audio output from a vehicle entertainment system.

20. The method of claim 16, further comprising detecting, by the controller, a vehicle operation of a vehicle in which the vehicle seat is installed, wherein generating the control signal comprises generating the control signal based upon the detected vehicle operation.

21. The vehicle seat haptic system of claim 1, wherein the controller is further configured to output the control signal to the one or more of the plurality of actuators to generate the asynchronous vibratory haptic output including a vibratory haptic output in at least a first haptic zone of the plurality of haptic zones that is out of sync with a vibratory haptic output in at least a second haptic zone of the plurality of haptic zones based on the position of the user in the vehicle seat.

* * * * *